US006019491A

United States Patent [19]

Tsai et al.

[11] Patent Number: 6,019,491

[45] Date of Patent: Feb. 1, 2000

[54] HEAD LIGHT FOR AUTOMOBILE

[75] Inventors: Han-Wen Tsai, Hsinchu Hsien; Chen-Ping Kung, Hsinchu, both of Taiwan

[73] Assignee: Industrial Technology Research Institute, Taiwan

[21] Appl. No.: 09/000,965

[22] Filed: Dec. 30, 1997

[30] Foreign Application Priority Data

Oct. 14, 1997 [TW] Taiwan ................................ 86114984

[51] Int. Cl.[7] ........................................................ B60Q 1/04

[52] U.S. Cl. .......................... 362/517; 362/539; 362/351; 362/544; 362/297; 362/346

[58] Field of Search .................................... 362/517, 520, 362/538, 539, 351, 297, 346, 516, 307, 308, 211

[56] References Cited

U.S. PATENT DOCUMENTS

| | | | |
|---|---|---|---|
| 4,985,816 | 1/1991 | Seko et al. . | |
| 5,055,981 | 10/1991 | Nino | 362/297 |
| 5,544,021 | 8/1996 | Lopez | 362/211 |
| 5,681,104 | 10/1997 | Chinniah et al. | 362/307 |

*Primary Examiner*—Thomas M. Sember
*Attorney, Agent, or Firm*—Rabin & Champagne, PC

[57] ABSTRACT

A headlight for automobiles with a head light filament and a high beam filament installed in the same poly-ellipsoid system. A part from the necessary parts in a conventional headlight, a reflector and a high beam filament are added. Thus, a high efficiency and a clear boundary of brightness are obtained under the conditions of smaller surface area.

11 Claims, 3 Drawing Sheets

HEAD LIGHT FOR AUTOMOBILE

BACKGROUND OF THE INVENTION

1. Field of the Invention

The invention relates to a headlight for automobiles, and more particular to a headlight with low beam and high beam radiating from the same poly-ellipsoid system (PES) for automobiles.

2. Description of the Related Art

In a conventional headlight for automobiles, due to the optical principles, normally, high beam and low beam do not radiate from the same PES. Referring to FIG. 1, to have low beam and high beam radiating from the same conventional headlight, a parabolic reflecting mirror 10 is in use. A low beam filament 14 and a high beam filament 15 are located on the optical axis 12 of the parabolic reflecting mirror 10. Since the optical paths for low beam and high beam are different, the low beam is reflected upward and a high beam radiates horizontally after being reflected by the parabolic reflecting mirror 10. The low beam thus designed forms a dazzling light for human being. In most of the European standards and regulations, an obvious boundary of brightness for low beam is necessary. Thus, this kind of headlight does not meet the requirement at all.

Another common headlight for automobiles adapts the design of locating the low beam filament and the high beam filament into two different PESs. An optical design for a high beam is shown in FIG. 2*a* and FIG. 2*b*. FIG. 2*a* is the vertical cross sectional view of the optical design for the high beam. On the optical axis 22 of a poly-ellipsoid reflecting mirror 20, a high beam filament 24 is located. The high beam radiated from the high beam filament 24 is reflected from the poly-ellipsoid reflecting mirror 20, and then, focuses on the second focus. After traveling through the lens 26, the high beam radiates nearly horizontally. FIG. 2*b* shows the horizontal cross sectional view of the optical design for the high beam. On the horizontal direction, the position of focusing is different from it on the vertical direction. After traveling through the lens 26, the high beam radiates with a wider angle. Referring to FIG. 2*c*, the optical design for a low beam is shown. Apart from a shade 28 located under the optical axis 22, the design is the same as FIG. 2*a*. With the existence of the shade 28, the light reflected upward from the mirror 20 is blocked. Therefore, the light radiated over the optical axis 22 (shown as a dash line) is very dim, and a contrast between upward and downward radiated lights is enhanced. The horizontal optical design of a low beam is similar to FIG. 2*b*. The description is omitted here. Using the design as shown in FIG. 2*a*, FIG. 2*b* and FIG. 2*c*, four PESs are needed for a car, and two PESs are needed for a motorcycle. Thus, a higher cost and a larger space are inevitable.

In U.S. Pat. No. 4,985,816, an improved headlight design is provided. Low beam and high beam can radiate from the same PES by using a liquid crystal display (LCD) to obtain the required light distributing pattern. However, since the temperature of the headlight is so high, the normal LCD material is easily altered. While being radiated by high intensity of light, the contrast of the boundary for brightness is difficult to enhance.

SUMMARY OF THE INVENTION

It is therefore an object of the invention to provide a headlight in which high and low beam filaments are installed in the same PES for automobiles. Therefore, under the condition of smaller surface area, a clear boundary of brightness is obtained, and the light efficiency is enhanced.

To achieve these objects and advantages, and in accordance with the purpose of the invention, as embodied and broadly described herein, the invention is directed towards a headlight in which high and low beam filaments are installed in the same PES. The low beam filament is located at the first focus of the poly-ellipsoid mirror. A shade is positioned about 1 mm to 3 mm in front of the second focus of the poly-ellipsoid mirror under its optical axis. A lens is located near to the intersection of the shade and the optical axis. A high beam filament is located near the rear focus of the lens. A reflector is located near the central position of the high beam filament, that is, near the rear focus of the lens. The purpose of the shade is to block the radiated light from the low beam coming under the optical axis. The poly-ellipsoid mirror and the reflector are used for collecting or diffusing the light coming from the low beam filament or the high beam filament.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate an embodiment of the invention and together with the description, serve to explain the principles of the invention. In the drawings.

DESCRIPTION OF THE PREFERRED EMBODIMENTS

In a headlight with a high beam filament and a low beam filament installed in the same PES, while the positions of the high and low beam filaments are properly arranged, the low beam can project to the determined area without dazzling by adding a shade. In addition, the high beam can illuminate the areas over and under the optical axis of the reflecting mirror. The above design is described as follows.

Figure 1:
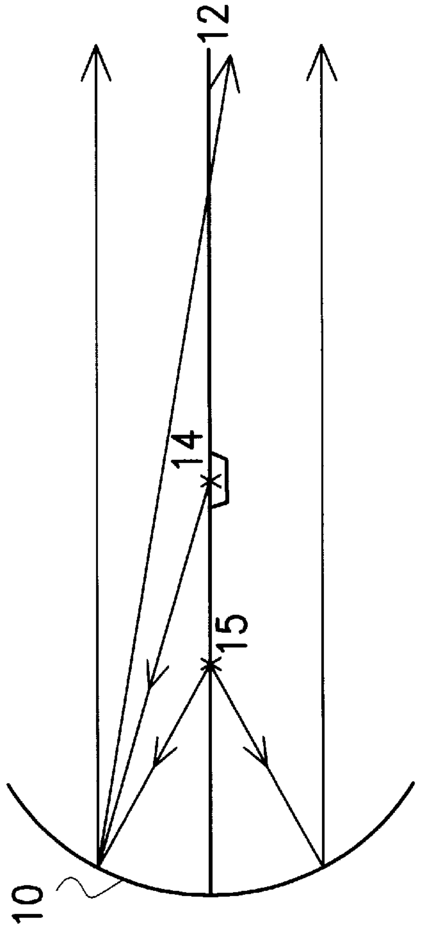
FIG. 1 (PRIOR ART)
FIG. 1 is a cross sectional view of a conventional of headlight in which a high beam and a low beam are radiated from the same mirror.
Figure 2A:
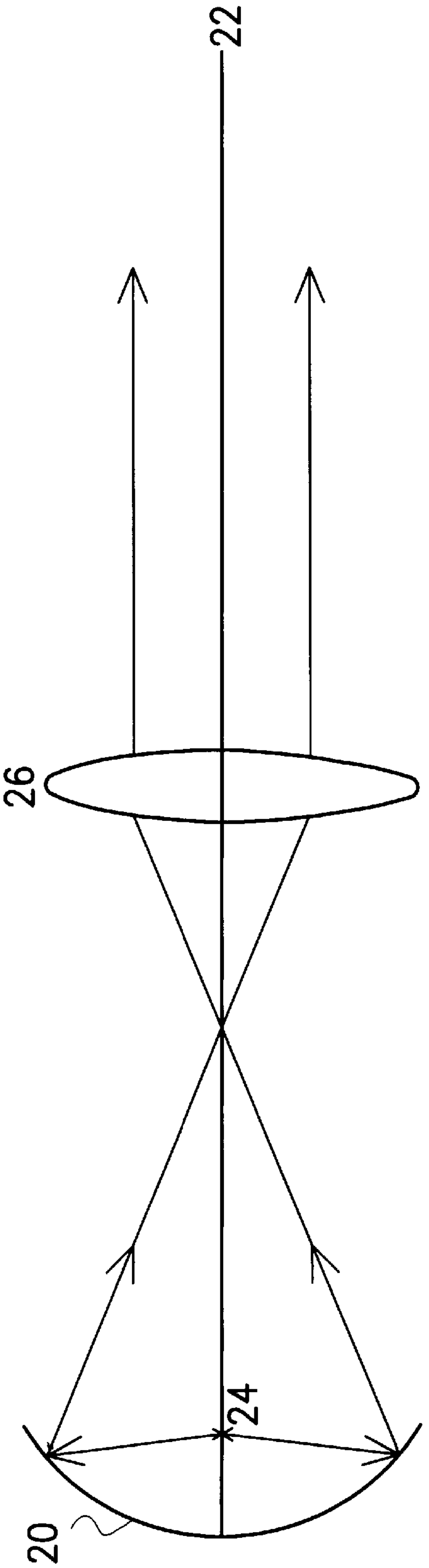
FIG. 2a (PRIOR ART)
FIG. 2*a* to FIG. 2*c* are cross sectional views of a conventional headlight in which separate PESs are used for high beam and low beam.
Figure 2B:
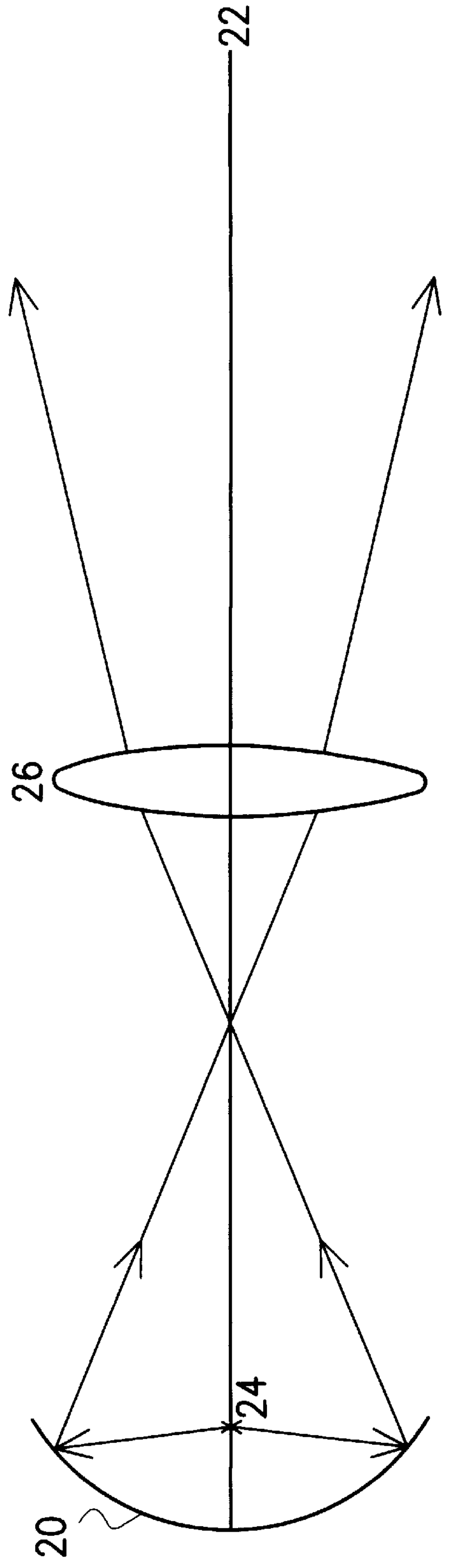
FIG. 2b (PRIOR ART)
Figure 2C:
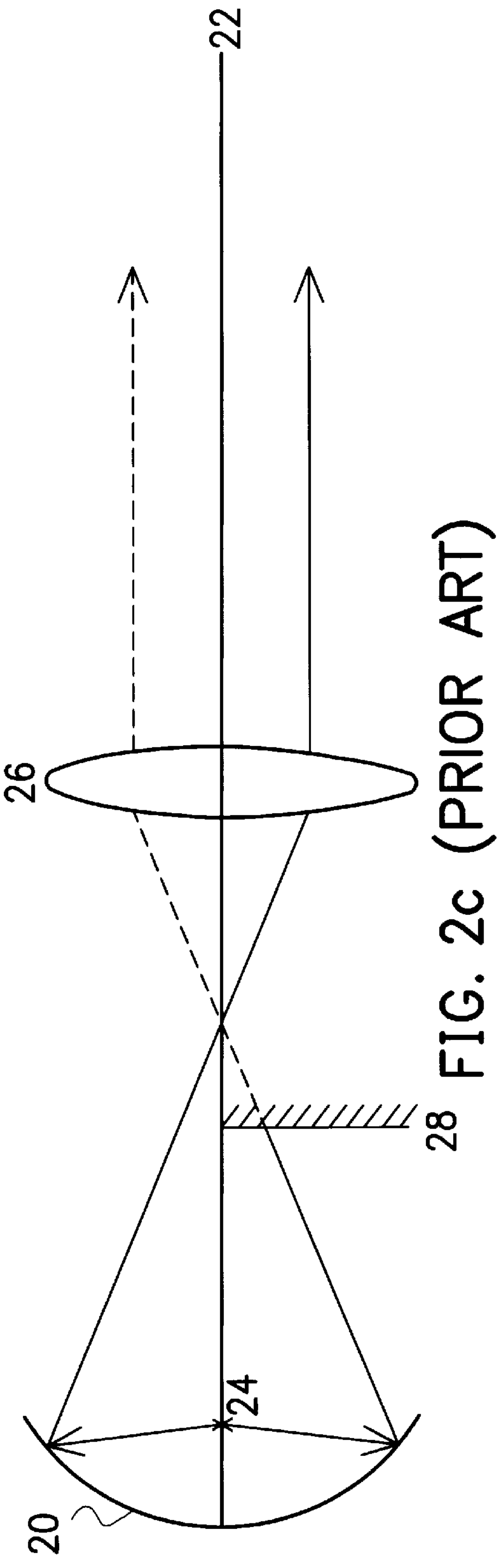
FIG. 2c (PRIOR ART)
Figure 3:
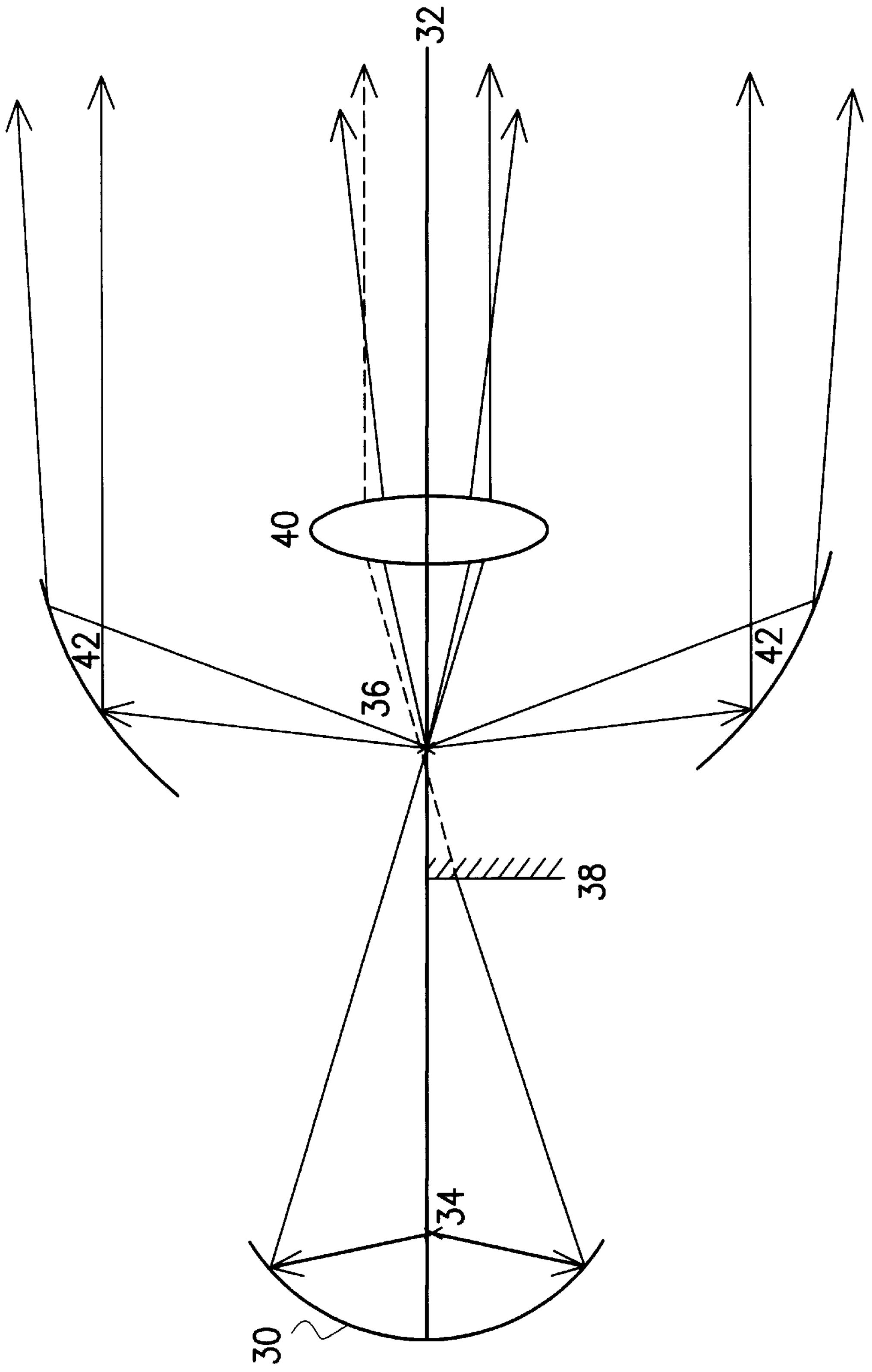
FIG. 3 shows a preferred embodiment according to the invention.

Referring to FIG. 3, a low beam filament 34 is installed at the first focus (focal point) of a poly-ellipsoid reflecting mirror 30. Being reflected from the poly-ellipsoid reflecting mirror 30, the low beam focuses on the second focus of the poly-ellipsoid reflecting mirror 30. At about 1 mm to 3 mm in front of the second focus of the poly-ellipsoid reflecting mirror 30, a shade 38, such as a flat plate or a cylindrical plate, is located under the optical axis 32 of the poly-ellipsoid mirror 30. Thus, the low beam coming from under the optical axis 32 is blocked. An obvious boundary of brightness is obtained.

The position of the high beam filament 36 is near the rear focus of a lens 40. The lens 40 is either a non-spherical or spherical reflecting mirror. A reflector 42, such as an ellipsoidal cylindrical reflector, a parabolic cylindrical reflector, or an arbitrary shaped reflector, has a focus near the center of the high beam filament. The light from the high beam filament traveling through the lens 40 becomes a nearly collimated light. Moreover, through the reflector 42, the high beam is partly diffused, and partly projects as a collimated light beam.

Thus, in a single PES, the low beam can be controlled by a shade to project onto the determined area, and the high beam can illuminate on the determined area by an additional reflector.

Table 1
shows a comparison of the U.S. Pat. No. 4,985,816 and the invention.

| | The Efficiency of high beam | The safety of low beam (contrast of boundary of brightness) |
|---|---|---|
| U.S. Pat. No. 4,985,816 | Low | Low |
| The invention | High | High |

Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A headlight for automobiles, in which a low beam filament and a high beam filament are installed in a poly-ellipsoid system, comprising:

a poly-ellipsoid reflecting mirror, the low beam filament being installed at a first focus of the poly-ellipsoid reflecting mirror;

a shade, located between a second focus of the poly-ellipsoid reflecting mirror and the poly-ellipsoid reflecting mirror, and under an optical axis of the poly-ellipsoid reflecting mirror;

a lens, having a rear focus near an intersection of the shade and the optical axis;

a high beam filament installed near the rear focus of the lens; and a reflector, having a focus near a center of the high beam filament, and near the rear focus of the lens;

wherein the shade blocks the light radiated from the low bean filament coming from under the optical axis;

the high beam filament being arranged between the lens and the low beam filament along the optical axis of the poly-ellipsoid reflecting mirror;

the low beam filament being arranged between the high beam filament and the poly-ellipsoid reflecting mirror along the same optical axis as the high beam filament; and the poly-ellipsoid reflecting mirror and the reflector collect and diffuse light radiated from the low beam filament and the high beam filament.

2. The headlight according to claim 1, wherein the shade is a flat plate.

3. The headlight according to claim 1, wherein shade is a cylindrical plate.

4. The headlight according to claim 1, wherein the shade is positioned at about 1 mm to 3 mm in front of the second focus of the poly-ellipsoid reflecting mirror.

5. The headlight according to claim 1, wherein the lens is a non-spherical mirror.

6. The headlight according to claim 1, wherein the lens is a spherical mirror.

7. The headlight according to claim 1, wherein the rear focus of the lens is located near the shade.

8. The headlight according to claim 1, wherein high beam filament center is located near the focus of the reflector.

9. The headlight according to claim 1, wherein the reflector is an ellipsoid cylindrical reflector.

10. The headlight according to claim 1, wherein the reflector is a parabolic cylindrical reflector.

11. A headlight for automobiles, in which a low beam filament and a high beam filament are installed in a poly-ellipsoid system, comprising:

a poly-ellipsoid reflecting mirror, the low beam filament being installed at a first focus of the poly-ellipsoid reflecting mirror;

a shade, located in front of a second focus of the poly-ellipsoid reflecting mirror, and under an optical axis of the poly-ellipsoid reflecting mirror;

a lens, having a rear focus near an intersection of the shade and the optical axis;

a high beam filament installed near the rear focus of the lens; and a reflector, having a focus near a center of the high beam filament, and near the rear focus of the lens;

wherein the shade is used to block the light radiated from the low beam filament coming from under the optical axis, and the shade is installed on the same optical axis with the low beam filament and the high beam filament;

the high beam filament is arranged between the lens and the low beam filament along the optical axis;

the low beam filament is arranged between the high beam filament and the poly-ellipsoid reflecting mirror along the optical axis; and the lens, the low beam filament and the high beam filament are installed in the same optical axis.

* * * * *